July 20, 1965    W. F. HUCH    3,195,834
ROTATING BALLOON SYSTEM
Filed Sept. 20, 1963
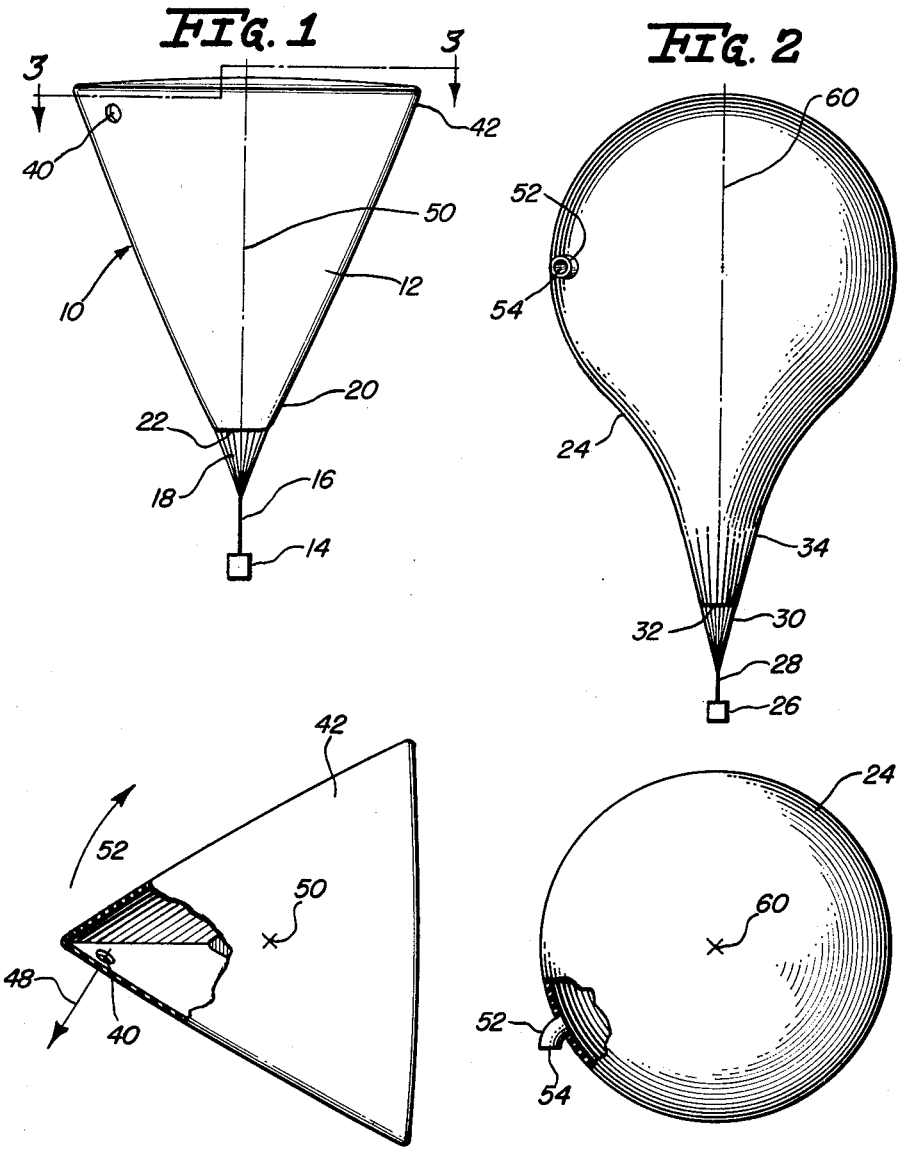
INVENTOR.
William F. Huch
BY
Richard J. Miller
Atty.

United States Patent Office 3,195,834
Patented July 20, 1965

3,195,834
ROTATING BALLOON SYSTEM
William F. Huch, St. Paul, Minn., assignor, by mesne assignments, to the United States of America as represented by the Secretary of the Navy
Filed Sept. 20, 1963, Ser. No. 310,511
3 Claims. (Cl. 244—31)

This invention relates to high altitude balloons and is concerned more particularly with balloons capable of rotating in flight.

It is an object of this invention to provide an improved rotating balloon.

Another object is to provide a balloon which is inflated and rotated by air intaken from the surrounding atmosphere.

Still another object is to provide a simple and efficient means for rotating an entire balloon system.

A further object is to provide a balloon system which rotates without use of an external power source.

Other objects and advantages of the invention will become apparent from the following description taken in connection with the accompanying drawings, wherein:

FIG. 1 is a more or less schematic drawing showing a fully inflated balloon embodying the present invention;

FIG. 2 is a more or less schematic drawing showing a modification of the invention;

FIG. 3 is a view taken along line 2—2 in FIG. 1; and

FIG. 4 is a partially sectioned more or less schematic plan view of the modification of FIG. 2.

The present invention relates to a balloon inflated with cold or ambient air as fully described in application Serial No. 310,513, assigned to the assignee of this application.

In high altitude research it is often necessary or desirable to rotate or change the orientation of the cameras or other scientific equipment being carried aloft. The purpose may involve such things as horizon searching or photography, sky brightness and polarization studies, infrared scanning, cloud studies and the like. Heretofore, additional equipment has been used to provide such reorientation of the instrument packages, substantially adding to problems. The present invention provides for a very simple and effective means for rotating the entire balloon structure while the balloon is either at ceiling altitude or ascending and descending.

Referring to FIG. 1, a balloon system designated generally at 10 is seen to comprise a balloon 12 supporting a payload 14, by means of a load line 16 connected thereto. The load line 16 may be attached to a balloon 12 in any suitable manner, such as shroud lines 18 which are connected to the skin of the balloon 12 in the usual manner, or by the use of a load ring (not shown) attached to the shroud lines 18 near the base 20 of balloon 12. A relatively large hole or opening 22 is provided adjacent to the base 20 to permit gradual circulation of the air mass within the balloon with the ambient atmosphere. The balloon system is sustained in flight and completely filled with cold, i.e., ambient air that is intaken from the atmosphere, and as more fully described in application Serial No. 310,513. The balloon 12 shown in FIG. 1 is represented as fully inflated and having a general tetrahedronal shape. Such a balloon is referred to as a tetroon but constitutes only one embodiment of the present invention.

FIG. 2 shows a usual, somewhat conically shaped balloon 24 embodying a modified form of the invention. Balloon 24 supports a load 26 on a load line 28 connected to shroud lines 30. A relatively large hole 32 is provided adjacent to the base 34 of balloon 24. The balloons 12 and 24 are formed preferably of an essentially inelastic thin film, such as Mylar or polyethelene.

Balloon system 10 is maintained aloft in a manner fully described in application Serial No. 310,513. Briefly, during the daylight hours the solar radiation passing through the balloon film raises the temperature of the contained air slightly above the temperature of the surrounding atmosphere. The excess in temperature of the contained air over the ambient air is called superheat and is usually expressed in degrees centigrade. This small condition of superheat in a large air mass can provide adequate lift for maintaining aloft a balloon composed of an inelastic film and carrying a relatively small payload. When the sun sets and solar radiation is no longer available to maintain the superheat of the air mass the balloon will lose some of its lift and begin descending. As the balloon descends the ambient air pressure, of course, increases; this compression of the contained air raises its temperature slightly thus increasing the lift and reducing the rate of descent of the balloon sufficiently to maintain the system airborne until the reappearance of the sun. As indicated in the other application herein mentioned previously, climatogical conditions play a decisive roll in the exact operation of such a balloon system.

In any case, the balloon system should be maintained at a satisfactory altitude until the reappearance of the sun and the infusion of additional solar energy to the contained air mass. Such energy will again result in a condition of superheat and therefore an increase in buoyancy and the ballon system will rise to its ceiling altitude. During this process the balloon is maintained substantially fully inflated because of the supplementation of the contained air mass with the ambient atmosphere through the opening adjacent the base. Since the confined air mass is constantly and automatically replenished the carrying of ballast is unnecessary and it is possible for the baloon system to remain aloft relatively indefinitely, a condition which is not possible when the other available lifting gases are employed.

Because cold or ambient air which is superheated is much less buoyant than the other usual lifting gases, a larger balloon will be necessary to achieve comparable altitudes. Further, such a balloon system contemplates the use of relatively small payloads.

Ordinarily, base opening 22 may be any size so long as free communication between the contained air mass and the surrounding atmosphere is effected. Preferably, an opening $\frac{1}{10}$ of the greatest lateral balloon dimension, more or less, will permit the proper functioning of the system.

Referring again to FIG. 1, an orifice 40 is located in the upper portion or crown 42 of balloon 12. Orifice 40 is relatively small in relation to base opening 22 being, preferably, on the order of $\frac{1}{10}$ thereof. The balloon system may be inflated and brought to altitude with orifice 40 covered or obstructed. When the obstruction is removed by any suitable means, it is seen that as ambient air is intaken through opening 22 it escapes through orifice 40. Further, since orifice 40 is located where there is internal pressure, i.e., in the crown 42 of the balloon, the air jet passing therethrough is slightly accelerated; this jet is represented at 48 in FIG. 3. Since air jet 48 or a component thereof, is perpendicular to the longitudinal axis 50 of balloon 12 a reactionary moment arises and causes balloon 12 to rotate in the opposite direction to air jet 48 as indicated by the arrow 52 in FIG. 3. To be sure, the force resulting from jet 48 is small but it has been found adequate to keep a large, ambient air balloon system rotating at several revolutions per hour. Further, rotation occurs constantly, both while the system is at altitude or ascending and descending. Thus, orifice 40 cooperates with the air replenishing means, base opening 22, to rotate the balloon system simply and effectively without the need of external power sources or elaborate equipment.

FIG. 4 shows a modification of the present invention.

Since the balloon 24 has a general cone shape an air jet passing through an orifice would cause a force reaction which would pass through the axis 60 thereof and not impart rotation thereto. Therefore, to direct the air jet, or a component thereof, at an angle to axis 60 an extension 52 is provided. Extension 52 may be integral with or attached in a suitable manner to balloon 24. Extension 52 has an orifice 54 which directs the air jet at an angle to axis 60 providing the necessary reactive force to impart rotation to the balloon system. Preferably, extension 52 is shown located at or near the greatest diameter of balloon 24 to provide the greatest moment arm through which the reactive force will act.

While preferred embodiments of the invention have been described, they should be regarded as examples of the invention and not as restrictions or limitations thereof, as changes may be made in the construction and arrangement of the parts without departing from the spirit and scope of the invention.

I claim:
1. A free, high altitude balloon system, comprising:
   (a) an inelastic film balloon defining a contained air mass;
   (b) means for replenishing said air mass with ambient air from the surrounding atmosphere as the balloon ascends and descends; and
   (c) means, including an orifice in said balloon in communication with said air mass and with the surrounding atmosphere, whereby air escapes through said orifice and imparts rotational motion to said balloon.
2. A free, high altitude balloon system, comprising:
   (a) an inelastic film balloon defining a contained air mass;
   (b) means, including an opening in the base of said balloon, said opening having a dimension on the order of 1 to 10 relative to the greatest lateral dimension of said balloon, thereby replenishing said air mass from ambient air from the surrounding atmosphere as the balloon ascends and descends; and
   (c) means, including an orifice adjacent the crown of the balloon, said orifice being smaller than said opening, cooperating with said replenishing means for imparting rotational motion to said balloon system.
3. A free, high altitude balloon system, comprising:
   (a) an inelastic film balloon defining a contained air mass;
   (b) means, including an opening in the base of said balloon, said opening having a dimension on the order of 1 to 10 relative to the greatest lateral dimension of said balloon, thereby replenishing said air mass with ambient air from the surrounding atmosphere as the balloon ascends and descends; and
   (c) means, including an orifice adjacent the crown of said balloon, said orifice having a dimension on the order of 1 to 10 relative to said opening, said orifice valving an air jet component perpendicular to the balloon axis whereby imparting rotational motion to said balloon system.

References Cited by the Examiner
UNITED STATES PATENTS

| | | | |
|---|---|---|---|
| 2,635,385 | 4/53 | Brown | 46—87 X |
| 2,960,282 | 11/60 | Winzen | 244—31 |
| 2,961,194 | 11/60 | Thorness | 244—31 |
| 2,991,027 | 7/61 | Geyling | 244—1 |

MILTON BUCHLER, *Primary Examiner.*

FERGUS S. MIDDLETON, *Examiner.*